(12) United States Patent
Wang

(10) Patent No.: US 10,117,183 B2
(45) Date of Patent: Oct. 30, 2018

(54) DATA TRANSMISSION METHOD AND DEVICE

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/524,969

(22) PCT Filed: Nov. 6, 2014

(86) PCT No.: PCT/CN2014/090515
§ 371 (c)(1),
(2) Date: May 5, 2017

(87) PCT Pub. No.: WO2016/070390
PCT Pub. Date: May 12, 2016

(65) Prior Publication Data
US 2017/0325166 A1    Nov. 9, 2017

(51) Int. Cl.
*H04B 7/00* (2006.01)
*H04W 52/02* (2009.01)

(52) U.S. Cl.
CPC .................. *H04W 52/0229* (2013.01)

(58) Field of Classification Search
CPC ............ H04W 52/0229; H04W 74/08; H04W 74/0808; H04W 74/0816
See application file for complete search history.

(56) References Cited

U.S. PATENT DOCUMENTS

| 7,916,650 B2 * | 3/2011 | Kim ................... H04L 43/0811 370/241 |
| 8,767,640 B2 * | 7/2014 | Lakkis ................. H04W 74/08 370/329 |
| 2008/0084835 A1 | 4/2008 | Goel et al. |

(Continued)

FOREIGN PATENT DOCUMENTS

| CN | 102273123 A | 12/2011 |
| CN | 102281595 A | 12/2011 |

(Continued)

OTHER PUBLICATIONS

"Considerations on LAA-LTE designs for fair co-existence," 3GPP TSG-RAN1 Meeting #78-bis, Ljubljana, Slovenija, R1-144131, 3rd Generation Partnership Project, Valbonne, France (Oct. 6-10, 2014).

(Continued)

*Primary Examiner* — Nguyen Vo
(74) *Attorney, Agent, or Firm* — Leydig, Voit & Mayer, Ltd.

(57) ABSTRACT

A data transmission method and a device are disclosed and relate to the field of communications technologies, so that the technical solutions can reduce power consumption of the second device during the channel detection. The method includes: determining, by a first device, a candidate-moment set; determining, by the first device, a target candidate moment from the candidate-moment set; and sending, by the first device, data on a channel according to the target candidate moment. The method and the device are used for data transmission.

12 Claims, 6 Drawing Sheets

(56) References Cited

U.S. PATENT DOCUMENTS

2010/0172311 A1    7/2010  Agrawal et al.
2015/0078230 A1    3/2015  Choi et al.
2016/0278078 A1*   9/2016  Cheng ............... H04W 72/0446

FOREIGN PATENT DOCUMENTS

| CN | 102595569 A | 7/2012 |
|---|---|---|
| CN | 103929824 A | 7/2014 |
| JP | 2009253473 | 10/2009 |
| KR | 20090080691 A | 7/2009 |
| KR | 20110107841 A | 10/2011 |
| WO | 2013128072 A1 | 9/2013 |
| WO | 2013132135 A1 | 9/2013 |
| WO | 2013151312 A1 | 10/2013 |
| WO | 2013187653 A1 | 12/2013 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 v12.3.0, pp. 1-124, 3rd Generation Partnership Project, Valbonne, France (Sep. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.3.0, pp. 1-378, 3rd Generation Partnership Project, Valbonne, France (Sep. 2014).

* cited by examiner

DATA TRANSMISSION METHOD AND DEVICE

CROSS-REFERENCE TO RELATED APPLICATIONS

This application is a national stage of International Application No. PCT/CN2014/090515, filed on Nov. 6, 2014, which is hereby incorporated by reference in its entirety.

TECHNICAL FIELD

Embodiments of the present disclosure relate to the field of communications technologies, and more specifically, to a data transmission method and a device.

BACKGROUND

In a licensed-assisted access using Long Term Evolution (LAA-LTE) system, a device uses a channel resource according to a listen before talk (LBT) rule. Operation modes of LBT include a load based equipment (LBE) operation mode and a frame based equipment (FBE) operation mode.

During data transmission in the LAA-LTE system, a receiving end device needs to continuously detect a channel to acquire data. This causes relatively high power consumption of the receive end device.

SUMMARY

Embodiments of the present disclosure provide a data transmission method and a device, so that power consumption of the device can be reduced when the device receives data.

According to a first aspect, an embodiment of the present disclosure provides a data transmission method, including: determining, by a first device, a candidate-moment set; determining, by the first device, a target candidate moment from the candidate-moment set; and sending, by the first device, data on a channel according to the target candidate moment.

With reference to the first aspect, in a first possible implementation manner, the determining, by the first device, a target candidate moment from the candidate-moment set includes: determining, by the first device, the target candidate moment from the candidate-moment set according to an end moment of a clear channel assessment CCA backoff process; and the sending, by the first device, data on a channel according to the target candidate moment includes: starting, by the first device, to send the data on the channel from the target candidate moment.

With reference to the first possible implementation manner of the first aspect, in a second possible implementation manner of the first aspect, the determining, by the first device, the target candidate moment from the candidate-moment set according to an end moment of a clear channel assessment CCA backoff process includes: determining, by the first device, the target candidate moment from the candidate-moment set, where the target candidate moment is equal to or later than the end moment of the CCA backoff process.

With reference to the second possible implementation manner of the first aspect, in a third possible implementation manner of the first aspect, if the target candidate moment is a candidate moment in the candidate-moment set that is later than the end moment of the CCA backoff process, the method further includes: starting, by the first device, to send padding data on the channel from the end moment of the CCA backoff process; and stopping, by the first device, sending the padding data on the channel from the target candidate moment, where the target candidate moment is a first candidate moment in the candidate-moment set that is later than the end moment of the CCA backoff process.

With reference to the second possible implementation manner of the first aspect, in a fourth possible implementation manner of the first aspect, if the target candidate moment is a candidate moment in the candidate-moment set that is later than the end moment of the CCA backoff process, the method further includes: starting, by the first device, to perform a CCA detection from the end moment of the CCA backoff process; and stopping, by the first device, performing the CCA detection from the target candidate moment, where the target candidate moment is a first candidate moment in the candidate-moment set at which the channel is idle and that is later than the end moment of the CCA backoff process.

With reference to the first aspect, in a fifth possible implementation manner of the first aspect, the determining, by the first device, a target candidate moment from the candidate-moment set includes: determining, by the first device, a first backoff threshold $N_{min}$ according to the candidate-moment set, where $N_{min}$ is a positive integer; determining, by the first device, an initial backoff value N from $[N_{min}, q]$, where q is a preset backoff threshold of the first device, and q is a positive integer greater than $N_{min}$; performing, by the first device, a clear channel assessment CCA backoff process according to the initial backoff value N; determining, by the first device, a current backoff value $N_c$; determining, by the first device, a second moment, where the second moment is a moment at which the current backoff value $N_c$ is equal to the first backoff threshold $N_{min}$; and determining, by the first device, the target candidate moment from the candidate-moment set, where the target candidate moment is not earlier than the second moment, the target candidate moment is earlier than a third moment, and the third moment is a moment at which the current backoff value $N_c$ is equal to 0; and the sending, by the first device, data on a channel according to the target candidate moment includes: starting, by the first device, to send the data on the channel from the target candidate moment.

With reference to the first aspect, in a sixth possible implementation manner of the first aspect, the sending, by the first device, data on a channel according to the target candidate moment includes: starting, by the first device, to perform a clear channel assessment CCA backoff process from the target candidate moment; and starting, by the first device, to send the data on the channel from an end moment of the CCA backoff process.

With reference to the first aspect or any one of the foregoing possible implementation manners of the first aspect, in a seventh possible implementation manner of the first aspect, the determining, by a first device, a candidate-moment set includes: determining, by the first device, the candidate-moment set according to a preset moment on the channel.

With reference to the seventh possible implementation manner of the first aspect, in an eighth possible implementation manner of the first aspect, the preset moment on the channel is any one of the following moments: a start moment of an orthogonal frequency division multiplexing OFDM symbol on the channel, a moment that corresponds to each 1/K of an orthogonal frequency division multiplexing symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

According to a second aspect, an embodiment of the present disclosure provides a data transmission method, including: determining, by a second device, a candidate-moment set; determining, by the second device, each candidate moment in the candidate-moment set; and receiving, by the second device, data on a channel according to each candidate moment.

With reference to the second aspect, in a first possible implementation manner of the second aspect, the receiving, by the second device, data on a channel according to each candidate moment includes: performing, by the second device, a channel detection on the channel at each candidate moment, so as to receive the data on the channel.

With reference to the second aspect, in a second possible implementation manner of the second aspect, the receiving, by the second device, data on a channel according to each candidate moment includes: determining, by the second device, an end moment of each clear channel assessment CCA detection according to each candidate moment; and performing, by the second device, a channel detection on the channel at the end moment of each CCA detection, so as to receive the data on the channel.

With reference to the second aspect or any one of the foregoing possible implementation manners of the second aspect, in a third possible implementation manner of the second aspect, the determining, by a second device, a candidate-moment set includes: determining, by the second device, the candidate-moment set according to a preset moment on the channel.

With reference to the third possible implementation manner of the second aspect, in a fourth possible implementation manner of the second aspect, the preset moment on the channel is any one of the following moments: a start moment of an orthogonal frequency division multiplexing OFDM symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

According to a third aspect, an embodiment of the present disclosure provides a first device, where the first device includes a first determining unit, a second determining unit, and a sending unit, where the first determining unit is configured to determine a candidate-moment set; the second determining unit is configured to determine a target candidate moment from the candidate-moment set determined by the first determining unit; and the sending unit is configured to send data on a channel according to the target candidate moment determined by the second determining unit.

With reference to the third aspect, in a first possible implementation manner of the third aspect, the second determining unit is specifically configured to determine the target candidate moment from the candidate-moment set according to an end moment of a clear channel assessment CCA backoff process; and the sending unit is specifically configured to start to send the data on the channel from the target candidate moment.

With reference to the first possible implementation manner of the third aspect, in a second possible implementation manner of the third aspect, the second determining unit is specifically configured to determine the target candidate moment from the candidate-moment set, where the target candidate moment is equal to or later than the end moment of the CCA backoff process.

With reference to the second possible implementation manner of the third aspect, in a third possible implementation manner of the third aspect, the sending unit is further configured to: if the target candidate moment is a candidate moment in the candidate-moment set that is later than the end moment of the CCA backoff process, start to send padding data on the channel from the end moment of the CCA backoff process, and stop sending the padding data on the channel from the target candidate moment, where the target candidate moment is a first candidate moment in the candidate-moment set that is later than the end moment of the CCA backoff process.

With reference to the second possible implementation manner of the third aspect, in a fourth possible implementation manner of the third aspect, the second determining unit is further configured to: if the target candidate moment is a candidate moment in the candidate-moment set that is later than the end moment of the CCA backoff process, start to perform a CCA detection from the end moment of the CCA backoff process, and stop performing the CCA detection from the target candidate moment, where the target candidate moment is a first candidate moment in the candidate-moment set at which the channel is idle and that is later than the end moment of the CCA backoff process.

With reference to the third aspect, in a fifth possible implementation manner of the third aspect, the second determining unit is specifically configured to: determine a first backoff threshold $N_{min}$ according to the candidate-moment set, where $N_{min}$ is a positive integer; determine an initial backoff value N from $[N_{min}, q]$, where q is a preset backoff threshold of the first device, and q is a positive integer greater than $N_{min}$; perform a clear channel assessment CCA backoff process according to the initial backoff value N; determine a current backoff value $N_c$; determine a second moment, where the second moment is a moment at which the current backoff value $N_c$ is equal to the first backoff threshold $N_{min}$; and determine the target candidate moment from the candidate-moment set, where the target candidate moment is not earlier than the second moment, the target candidate moment is earlier than a third moment, and the third moment is a moment at which the current backoff value $N_c$ is equal to 0; and the sending unit is specifically configured to start to send the data on the channel from the target candidate moment.

With reference to the third aspect, in a sixth possible implementation manner of the third aspect, the second determining unit is further configured to start to perform a clear channel assessment CCA backoff process from the target candidate moment; and the sending unit is specifically configured to start to send the data on the channel from an end moment of the CCA backoff process.

With reference to the third aspect or any one of the foregoing possible implementation manners of the third aspect, in a seventh possible implementation manner of the third aspect, the first determining unit is specifically configured to determine the candidate-moment set according to a preset moment on the channel.

According to a fourth aspect, an embodiment of the present disclosure provides a second device, where the second device includes a first determining unit, a second determining unit, and a receiving unit, where the first determining unit is configured to determine a candidate-moment set; the second determining unit is configured to determine each candidate moment in the candidate-moment set determined by the first determining unit; and the receiving unit is configured to receive data on a channel according to each candidate moment determined by the second determining unit.

With reference to the fourth aspect, in a first possible implementation manner of the fourth aspect, the receiving unit is specifically configured to perform a channel detection on the channel at each candidate moment, so as to receive the data on the channel.

With reference to the fourth aspect, in a second possible implementation manner of the fourth aspect, the second determining unit is further configured to determine an end moment of each clear channel assessment CCA detection according to each candidate moment; and the receiving unit is specifically configured to perform a channel detection on the channel at the end moment of each CCA detection, so as to receive the data on the channel.

With reference to the fourth aspect or any one of the foregoing possible implementation manners of the fourth aspect, in a third possible implementation manner of the fourth aspect, the first determining unit is specifically configured to determine the candidate-moment set according to a preset moment on the channel.

According to a fifth aspect, an embodiment of the present disclosure provides a first device, where the first device includes a processor and a transmitter, where the processor is configured to determine a candidate-moment set; the processor is further configured to determine a target candidate moment from the candidate-moment set determined by the processor; and the transmitter is configured to send data on a channel according to the target candidate moment determined by the processor.

With reference to the fifth aspect, in a first possible implementation manner of the fifth aspect, the processor is specifically configured to determine the target candidate moment from the candidate-moment set according to an end moment of a clear channel assessment CCA backoff process; and the transmitter is specifically configured to start to send the data on the channel from the target candidate moment.

With reference to the first possible implementation manner of the fifth aspect, in a second possible implementation manner of the fifth aspect, the processor is specifically configured to determine the target candidate moment from the candidate-moment set, where the target candidate moment is equal to or later than the end moment of the CCA backoff process.

With reference to the second possible implementation manner of the fifth aspect, in a third possible implementation manner of the fifth aspect, the transmitter is further configured to: if the target candidate moment is a candidate moment in the candidate-moment set that is later than the end moment of the CCA backoff process, start to send padding data on the channel from the end moment of the CCA backoff process, and stop sending the padding data on the channel from the target candidate moment, where the target candidate moment is a first candidate moment in the candidate-moment set that is later than the end moment of the CCA backoff process.

With reference to the second possible implementation manner of the fifth aspect, in a fourth possible implementation manner of the fifth aspect, the processor is further configured to: if the target candidate moment is a candidate moment in the candidate-moment set that is later than the end moment of the CCA backoff process, start to perform a CCA detection from the end moment of the CCA backoff process, and stop performing the CCA detection from the target candidate moment, where the target candidate moment is a first candidate moment in the candidate-moment set at which the channel is idle and that is later than the end moment of the CCA backoff process.

With reference to the fifth aspect, in a fifth possible implementation manner of the fifth aspect, the processor is specifically configured to: determine a first backoff threshold $N_{min}$ according to the candidate-moment set, where $N_{min}$ is a positive integer; determine an initial backoff value N from $[N_{min}, q]$, where q is a preset backoff threshold of the first device, and q is a positive integer greater than $N_{min}$; perform a clear channel assessment CCA backoff process according to the initial backoff value N; determine a current backoff value $N_c$; determine a second moment, where the second moment is a moment at which the current backoff value $N_c$ is equal to the first backoff threshold $N_{min}$; and determine the target candidate moment from the candidate-moment set, where the target candidate moment is not earlier than the second moment, the target candidate moment is earlier than a third moment, and the third moment is a moment at which the current backoff value $N_c$ is equal to 0; and the transmitter is specifically configured to start to send the data on the channel from the target candidate moment.

With reference to the fifth aspect, in a sixth possible implementation manner of the fifth aspect, the processor is further configured to start to perform a clear channel assessment CCA backoff process from the target candidate moment; and the transmitter is specifically configured to start to send the data on the channel from an end moment of the CCA backoff process.

With reference to the fifth aspect or any one of the foregoing possible implementation manners of the fifth aspect, in a seventh possible implementation manner of the fifth aspect, the processor is specifically configured to determine the candidate-moment set according to a preset moment on the channel.

According to a sixth aspect, an embodiment of the present disclosure provides a second device, where the second device includes a processor and a receiver, where the processor is configured to determine a candidate-moment set; the processor is further configured to determine each candidate moment in the candidate-moment set determined by the processor; and the receiver is configured to receive data on a channel according to each candidate moment determined by the processor.

With reference to the sixth aspect, in a first possible implementation manner of the sixth aspect, the receiver is specifically configured to perform a channel detection on the channel at each candidate moment, so as to receive the data on the channel.

With reference to the sixth aspect, in a second possible implementation manner of the sixth aspect, the processor is further configured to determine an end moment of each clear channel assessment CCA detection according to each candidate moment; and the receiver is specifically configured to perform a channel detection on the channel at the end moment of each CCA detection, so as to receive the data on the channel.

With reference to the sixth aspect or any one of the foregoing possible implementation manners of the sixth aspect, in a third possible implementation manner of the sixth aspect, the processor is specifically configured to determine the candidate-moment set according to a preset moment on the channel.

In the foregoing technical solutions, a moment at which a first device sends data is determined according to a candidate moment in a candidate-moment set. In this case, a corresponding second device that receives the data may also determine, according to the candidate moment in the candidate-moment set, a moment at which the data can be received. That is, the second device may perform a channel detection only at a moment at which the data can be sent and that is specified in a system, and does not need to continually perform the channel detection at other moments. Therefore, the foregoing technical solutions can reduce power consumption of the second device during the channel detection.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
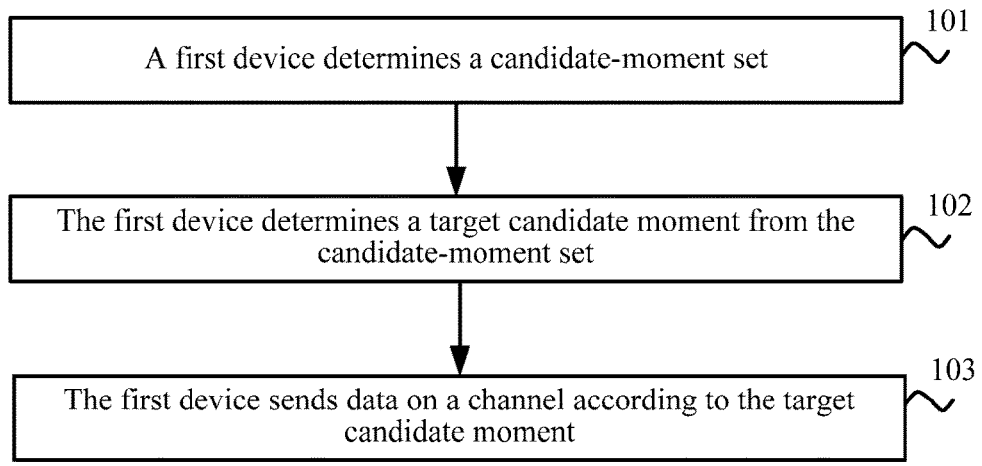
FIG. 1 is a schematic flowchart of a data transmission method according to an embodiment of the present disclosure.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Devices involved in the embodiments of the present disclosure are all devices in an LAA-LTE system. More specifically, the devices involved in the embodiments of the present disclosure are all devices that operate in an LBE operation mode.

The devices involved in the embodiments of the present disclosure may be user equipment or network side devices. The user equipment may also be referred to as a mobile terminal, for example, a mobile phone (or referred to as a "cellular" phone) or a computer with a mobile terminal. For example, the user equipment may be a portable, pocket-sized, handheld, computer built-in, or in-vehicle mobile apparatus, and is not limited in the present disclosure. The network side device may be a base station or an access point (AP), and is not limited in the present disclosure.

The "first", "second", and "third" in a first device, a second device, and a third device in the embodiments of the present disclosure are only intended for distinguishing the devices, but not for limiting the devices.

To help understand the present disclosure better, related elements involved in the embodiments of the present disclosure are described first.

Clear Channel Assessment (CCA) Backoff:

A device performs a CCA backoff before the device occupies a channel resource to send data. Specifically, the device randomly selects an integer N from 1 to q as an initial backoff value, where q may be referred to as a preset backoff threshold of the device, and q is a preset positive integer greater than 1. If the device determines, when performing a CCA detection, that the channel resource is not occupied, N is subtracted by 1. If the device determines, when performing a CCA detection, that the channel resource is occupied, a backoff value is kept unchanged. A backoff value determined after each CCA detection may be referred to as a current backoff value $N_c$. A process in which the device progressively decreases the initial backoff value according to the initial backoff value and a CCA detection may be referred to as the CCA backoff.

A Result of the CCA Backoff:

The result of the CCA backoff refers to the current backoff value $N_c$ that is obtained after the device performs the CCA detection.

Backoff Condition:

If the current backoff value $N_c$ that is determined after the device performs the CCA detection is 0, it may be considered that the result of the CCA backoff satisfies the backoff condition. If the current backoff value $N_c$ that is determined after the device performs the CCA detection is a positive integer greater than 0, it may be considered that the result of the CCA backoff does not satisfy the backoff condition.

For example, a device determines that N=12 and starts to perform a CCA backoff. If the device determines, after performing a first CCA detection, that a channel resource is occupied, the device determines that a current backoff value obtained after the first CCA detection is: $N_c(1)=N=12$. If the device determines, after performing a second CCA detection, that the channel resource is not occupied, the device determines that a current backoff value obtained after the second CCA detection is: $N_c(2)=N_c(1)-1=11$. That is, if after an $i^{th}$ CCA detection is performed, it is determined that the channel resource is occupied, a current backoff value obtained after the $i^{th}$ CCA detection is $N_c(i)=N_c(i-1)$. $N_c(i-1)$ is the current backoff value obtained after the $(i-1)^{th}$ CCA detection. If after an $i^{th}$ CCA detection is performed, it is determined that the channel resource is not occupied, a current backoff value obtained after the $i^{th}$ CCA detection is $N_c(i)=N_c(i-1)-1$, where i is a positive integer greater than 1, and $N_c(0)=N$. If a current backoff value obtained after a $j^{th}$ CCA detection is $N_c(j)=0$, it may be determined that a current backoff value $N_c$ obtained after the $j^{th}$ CCA detection satisfies a backoff condition. An end moment of the $j^{th}$ CCA detection is an end moment of a CCA backoff process. It may be understood that, j is a positive integer greater than or equal to N. That is, the device needs to perform at least N CCA detections.

The channel or channel resource mentioned in the embodiments of the present disclosure may be a channel resource on an unlicensed spectrum, or may be a channel resource on a licensed spectrum.

FIG. 1 is a schematic flowchart of a data transmission method according to an embodiment of the present disclosure. The method shown in FIG. 1 is performed by a first device, and the first device may be a device in an LAA-LTE system.

101: The first device determines a candidate-moment set.

102: The first device determines a target candidate moment from the candidate-moment set.

103: The first device sends data on a channel according to the target candidate moment.

According to the method shown in FIG. 1, a moment at which a first device sends data is determined according to a candidate moment in a candidate-moment set. In this case, a corresponding second device that receives the data may also determine, according to the candidate moment in the candidate-moment set, a moment at which the data can be received. That is, the second device may perform a channel detection only at a moment at which the data can be sent and that is specified in a system, and does not need to continually perform the channel detection at other moments. Therefore, the method shown in FIG. 1 can reduce power consumption of the second device during the channel detection.

The first device may determine the candidate-moment set in multiple manners, and this is not limited in the present disclosure. For example, the candidate-moment set may be preconfigured and stored in the first device. For another example, the candidate-moment set may be preconfigured and stored in the first device. In this case, the first device may send the candidate-moment set to another device. For still another example, the candidate-moment set may be determined by the first device. In this case, the first device may send the candidate-moment set to another device. For still another example, the candidate-moment set may be sent by a third device to the first device and a second device. The second device is a device that receives the data sent by the first device. For still another example, the candidate-moment set is determined by the first device according to feedback information sent by the second device. The second device is a device that receives the data sent by the first device.

The candidate-moment set may be flexibly configured. For example, the candidate-moment set may be periodical or non-periodical. The candidate-moment set may be expressed by using a group of preset moments, or the candidate-moment set may be expressed by using a formula.

Optionally, in an embodiment, the determining, by the first device, a target candidate moment from the candidate-moment set includes: determining, by the first device, the target candidate moment from the candidate-moment set according to an end moment of a CCA backoff process. In this case, the sending, by the first device, data to a second device according to the target candidate moment includes: starting, by the first device, to send the data on the channel from the target candidate moment.

Optionally, in an embodiment, the determining, by the first device, the target candidate moment from the candidate-moment set according to an end moment of a CCA backoff process includes: determining, by the first device, the target candidate moment from the candidate-moment set, where the target candidate moment is equal to or later than the end moment of the CCA backoff process.

Further, if the candidate-moment set includes the end moment of the clear channel assessment backoff process, the target candidate moment may be equal to the end moment of the clear channel assessment backoff process. If the candidate-moment set does not include the end moment of the clear channel assessment backoff process, the target candidate moment may be a candidate moment in the candidate-moment set that is later than the end moment of the clear channel assessment backoff process.

Optionally, in an embodiment, if the target candidate moment is a candidate moment in the candidate-moment set that is later than the end moment of the clear channel assessment backoff process, the method further includes: starting, by the first device, to send padding data on the channel from the end moment of the clear channel assessment backoff process; and stopping, by the first device, sending the padding data on the channel from the target candidate moment. The target candidate moment is a first candidate moment in the candidate-moment set that is later than the end moment of the clear channel assessment backoff process. In this way, by sending the padding data, the first device may prevent a channel resource from being occupied by another device.

Optionally, in another embodiment, if the target candidate moment is a candidate moment in the candidate-moment set that is later than the end moment of the CCA backoff process, the method further includes: starting, by the first device, to perform a CCA detection from the end moment of the CCA backoff process; and stopping, by the first device, performing the CCA detection from the target candidate moment, where the target candidate moment is a first candidate moment in the candidate-moment set at which the channel is idle and that is later than the end moment of the CCA backoff process. In other words, the target candidate moment is a candidate moment later than the end moment of the CCA backoff process, and the channel is idle at the candidate moment.

Optionally, in another embodiment, the determining, by the first device, a target candidate moment from the candidate-moment set includes: determining, by the first device, a first backoff threshold $N_{min}$ according to the candidate-moment set, where $N_{min}$ is a positive integer; determining, by the first device, an initial backoff value N from $[N_{min}, q]$, where q is a preset backoff threshold of the first device, and q is a positive integer greater than $N_{min}$; performing, by the first device, a CCA backoff process according to the initial backoff value N; determining, by the first device, a current backoff value $N_c$; determining, by the first device, a second moment, where the second moment is a moment at which the current backoff value $N_c$ is equal to the first backoff threshold $N_{min}$; and determining, by the first device, the target candidate moment from the candidate-moment set, where the target candidate moment is not earlier than the second moment, the target candidate moment is earlier than a third moment, and the third moment is a moment at which the current backoff value $N_c$ is equal to 0. The sending, by the first device, data on a channel according to the target candidate moment includes: starting, by the first device, to send the data on the channel from the target candidate moment. The target candidate moment may be a first candidate moment in the candidate-moment set that is later than the second moment.

Optionally, in an embodiment, the sending, by the first device, data to a second device on a channel according to the target candidate moment includes: starting, by the first device, to perform a CCA backoff from the target candidate moment; and starting, by the first device, to send the data on the channel from an end moment of the CCA backoff.

Further, the determining, by a first device, a candidate-moment set includes: determining, by the first device, the candidate-moment set according to a preset moment on the channel. The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

Figure 2:
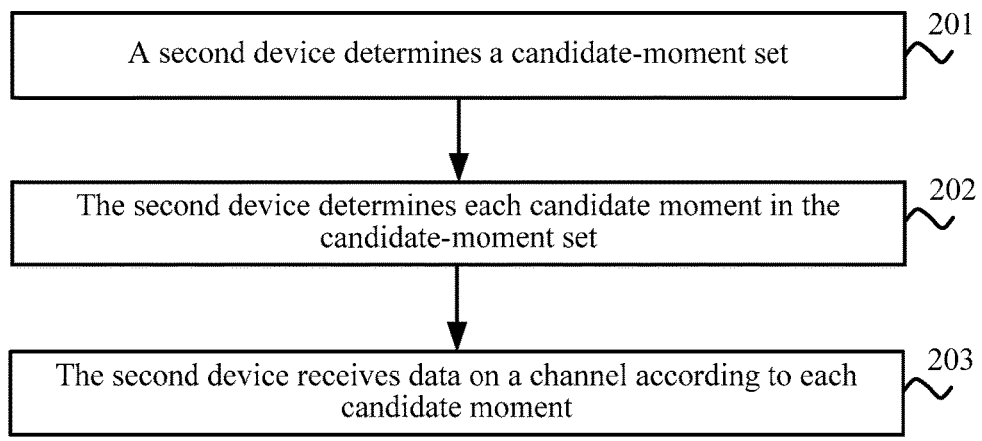
FIG. 2 is a schematic flowchart of a data transmission method according to an embodiment of the present disclosure.

FIG. 2 is a schematic flowchart of a data transmission method according to an embodiment of the present disclosure. The method shown in FIG. 2 is performed by a second device, and the second device may be a device in an LAA-LTE system.

201: The second device determines a candidate-moment set.

202: The second device determines each candidate moment in the candidate-moment set.

203: The second device receives data on a channel according to each candidate moment.

According to the method shown in FIG. 2, the second device may determine, according to each candidate moment in the candidate-moment set, the moment at which the data can be received. That is, the second device may perform a channel detection only at a moment at which the data can be sent and that is specified in a system, and does not need to continually perform the channel detection at other moments. Therefore, power consumption of the second device during the channel detection is reduced. The data received by the second device may be sent by the first device shown in FIG. 1.

Similar to the embodiment shown in FIG. 1, the second device may obtain the candidate-moment set in multiple manners, and this is not limited in the present disclosure. For example, the candidate-moment set may be preconfigured and stored in the first device and the second device. For another example, the candidate-moment set may be preconfigured and stored in the first device. In this case, the second device may receive the candidate-moment set sent by the first device. For still another example, the candidate-moment set may be determined by the first device. In this case, the first device may send a sending moment sequence to the second device. For still another example, the second device may determine feedback information used to indicate the candidate-moment set, and send the feedback information to the first device that sends the data.

The candidate-moment set may be flexibly configured. For example, the candidate-moment set may be periodical or non-periodical. The candidate-moment set may be expressed by using a group of preset moments, or the candidate-moment set may be expressed by using a formula. This is not limited in present disclosure.

Optionally, in an embodiment, the receiving, by the second device, data on a channel according to each candidate moment includes: performing, by the second device, a channel detection on the channel at each candidate moment, so as to receive the data on the channel.

Optionally, in an embodiment, the receiving, by the second device, data on a channel according to each candidate moment includes: determining, by the second device, an end moment of each CCA detection according to each candidate moment; and performing, by the second device, a channel detection on the channel at the end moment of each CCA detection, so as to receive the data on the channel.

Further, the determining, by a second device, a candidate-moment set includes: determining, by the second device, the candidate-moment set according to a preset moment on the channel.

Further, the determining, by a second device, a candidate-moment set includes: determining, by the second device, the candidate-moment set according to a preset moment on the channel. The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

To help understand the present disclosure better, the following describes the present disclosure with reference to specific embodiments. It should be noted that the specific embodiments described below are only intended for helping understand the present disclosure better, but not for limiting the present disclosure.

Figure 3:
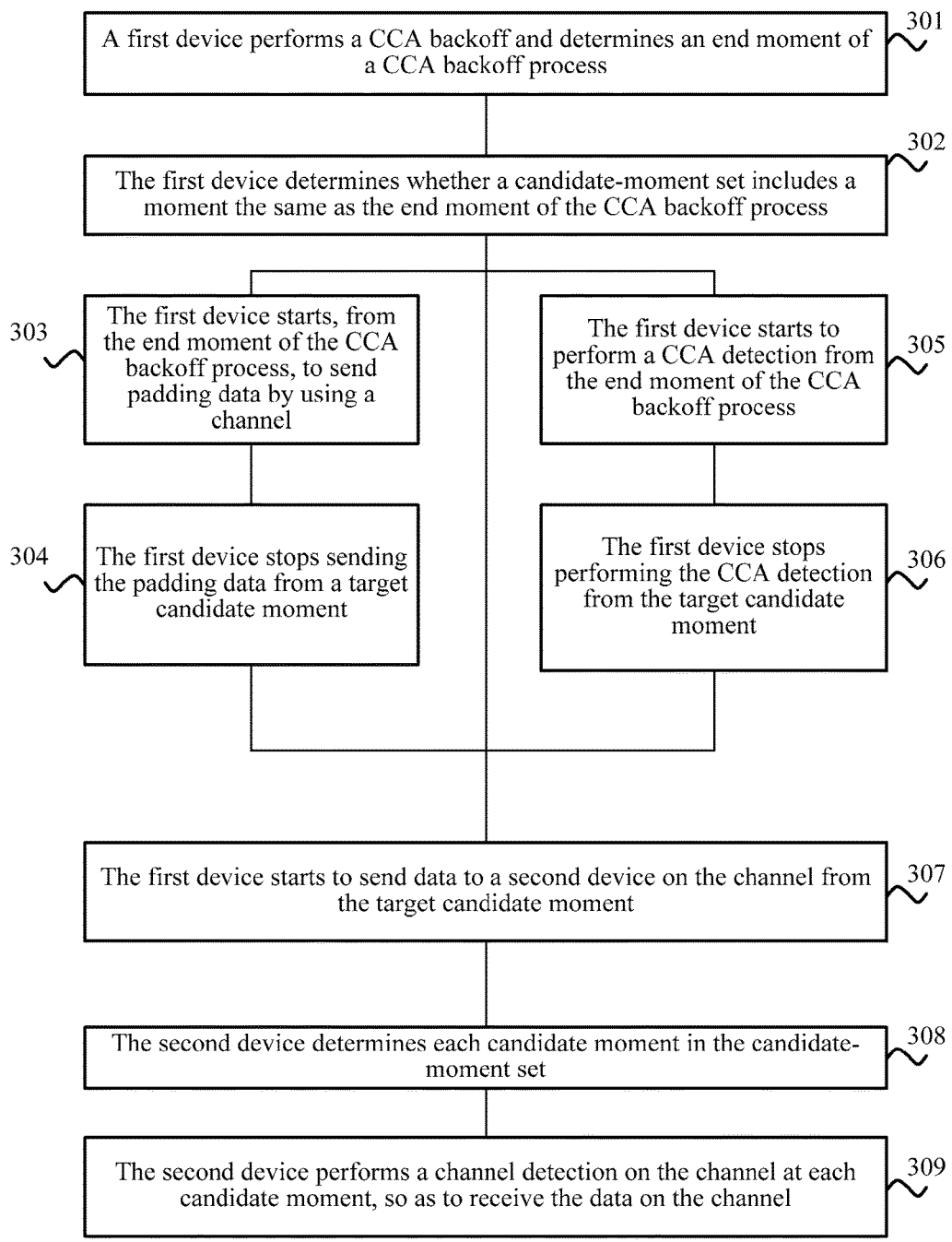
FIG. 3 is a schematic flowchart of a data transmission method according to another embodiment of the present disclosure.

FIG. 3 is a schematic flowchart of a data transmission method according to another embodiment of the present disclosure.

301: A first device performs a CCA backoff and determines an end moment of a CCA backoff process, where the end moment of the CCA backoff process is a moment at which a result of the CCA backoff satisfies a backoff condition.

Specifically, that a first device performs a CCA backoff includes: The first device determines, according to a CCA, that a channel is occupied. The first device determines an initial backoff value. The first device determines a result of the CCA backoff and determines, according to the result of the CCA backoff, whether a backoff condition is satisfied. If the first device determines, according to the result of the CCA backoff, that the backoff condition is satisfied, the first device completes the CCA backoff. If the first device determines, according to the result of the CCA backoff, that the backoff condition is not satisfied, the first device continues to perform the CCA backoff.

302: The first device determines whether the candidate-moment set includes a moment the same as the end moment of the CCA backoff process.

Specifically, if the first device determines that the candidate-moment set includes a candidate moment the same as the end moment of the CCA backoff process, the first device may determine that the end moment of the CCA backoff process is a target candidate moment. If the first device determines that the candidate-moment set does not include a moment the same as the end moment of the CCA backoff process, the first device may select a target candidate moment from a candidate moment in the candidate-moment set that is later than the end moment of the CCA backoff process. The target candidate moment may be a candidate moment later than the end moment of the CCA backoff process.

Optionally, in an embodiment, if the target candidate moment is later than the end moment of the CCA backoff process, the method further includes step 303 and step 304.

303: The first device starts, from the end moment of the CCA backoff process, to send padding data by using a channel.

304: The first device stops sending the padding data from a target candidate moment, where the target candidate moment is a first candidate moment in the candidate-moment set that is later than the end moment of the CCA backoff process.

That is, by sending the padding data, the first device occupies the channel from the end moment of the CCA backoff process. Therefore, the first device may determine that the target candidate moment is the first candidate moment later than the end moment of the clear channel assessment backoff process.

If step 303 and step 304 are performed, the first device may occupy the channel, to prevent another device from preempting the channel.

Optionally, in another embodiment, if the target candidate moment is later than the end moment of the CCA backoff process, the method may further include step 305 and step 306.

305: The first device starts to perform a CCA detection from the end moment of the CCA backoff process.

306: The first device stops performing the CCA detection from the target candidate moment, where the target candidate moment is a first candidate moment in the candidate-moment set at which the channel is idle and that is later than the end moment of the CCA backoff process.

Step 305 and step 306 may be considered as that after a current backoff value is equal to 0, the first device continues to perform a CCA detection until the first candidate moment at which the channel is idle and that is later than the end moment of the CCA backoff process. That is, if the first device determines that the channel is occupied at the first candidate moment later than the end moment of the CCA backoff process, the first device continues to perform a CCA detection until the first candidate moment at which the channel is idle and that is later than the end moment of the CCA backoff process.

307: The first device starts to send data to a second device on the channel from the target candidate moment.

308: The second device determines each candidate moment in the candidate-moment set.

309: The second device performs a channel detection on the channel at each candidate moment, so as to receive the data on the channel.

It may be understood that, the first device may not start to send data to the second device from each moment indicated in each sending moment sequence, but the second device starts to perform a channel detection from each moment indicated in each sending moment sequence. Therefore, step 308 and step 309 may be performed before or after any one of step 301 to step 307.

According to the method shown in FIG. 3, a moment at which a first device sends data is a candidate moment in a preset candidate-moment set. A second device also starts to perform a channel detection only at a candidate moment in the candidate-moment set, so as to receive the data. In this way, the second device can accurately receive the data sent by the first device, without needing to continually perform the channel detection. In this case, power consumption of the second device during receiving of the data is greatly reduced.

Figure 4:
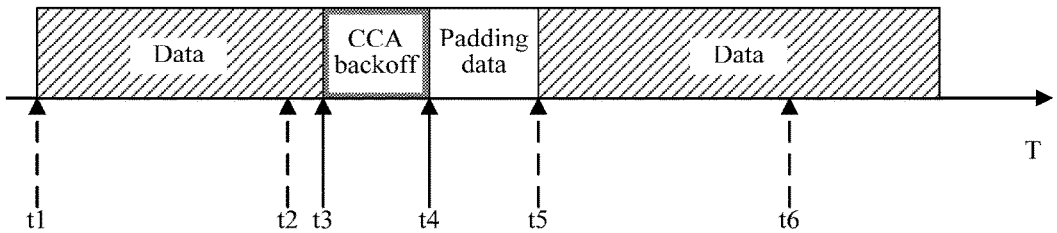
FIG. 4 is a schematic diagram of a data transmission method according to another embodiment of the present disclosure.

FIG. 4 is a schematic diagram of a data transmission method according to another embodiment of the present disclosure. Specifically, a sequence diagram shown in FIG. 4 is a schematic diagram according to an embodiment of the data transmission method shown in FIG. 3.

Moments t1, t2, t5, and t6 shown in FIG. 4 are separately four continual candidate moments in a candidate-moment set. In other words, the four moments t1, t2, t5, and t6 are moments at which data may be sent. Therefore, a second device may perform a channel detection at the four moments, so as to prepare to receive the data. A first device starts to perform a CCA backoff from the moment t3. A moment t4 is a moment at which a result of the CCA backoff of the first device satisfies a backoff condition. The moment t4 is not a candidate moment. In this case, the first device starts, from the moment t4, to send padding data by using a channel. The moment t5 is a candidate moment in the candidate-moment set. Therefore, from the moment t5, the first device stops sending the padding data and starts to send the data on the channel.

Figure 5:
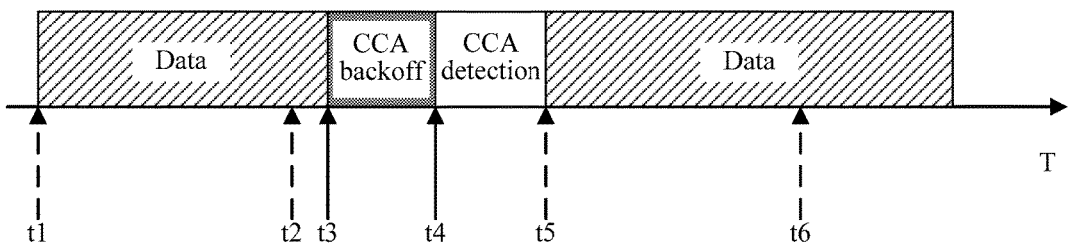
FIG. 5 is a schematic diagram of a data transmission method according to another embodiment of the present disclosure.

FIG. 5 is a schematic diagram of a data transmission method according to another embodiment of the present disclosure. Specifically, a sequence diagram shown in FIG. 5 is a schematic diagram according to another embodiment of the data transmission method shown in FIG. 3.

Moments t1, t2, t5, and t6 shown in FIG. 5 are separately four continual candidate moments in a candidate-moment set. In other words, the four moments t1, t2, t5, and t6 are moments at which data may be sent. Therefore, a second device may perform a channel detection at the four moments, so as to prepare to receive the data. A first device starts to perform a CCA backoff from the moment t3. A moment t4 is a moment at which a result of the CCA backoff of the first device satisfies a backoff condition. The moment t4 is not a candidate moment. In this case, the first device starts to perform a CCA detection from the moment t4. If it is found according to the CCA detection from the moment t4 to the moment t5 that a channel is not occupied, the first device may start, from the moment t5, to send the data by using the channel. It may be understood that, the CCA detection shown in FIG. 5 refers to all CCA detections from the moment t4 to the moment t5.

Figure 6:
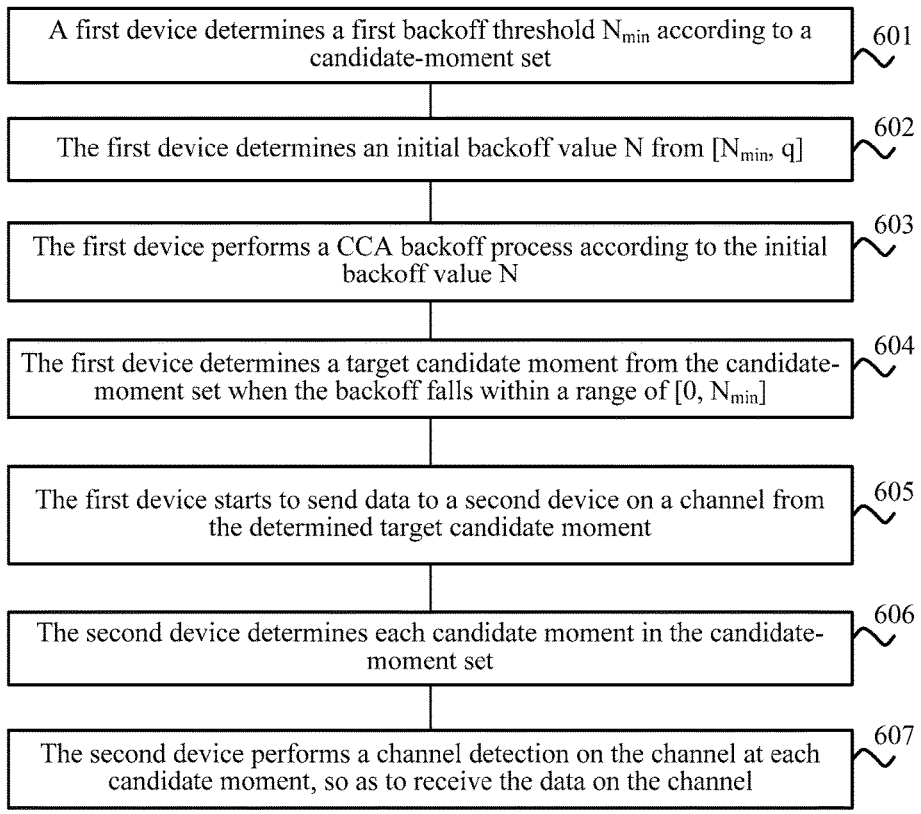
FIG. 6 is a schematic flowchart of a data transmission method according to another embodiment of the present disclosure.

FIG. 6 is a schematic flowchart of a data transmission method according to another embodiment of the present disclosure.

601: A first device determines a first backoff threshold $N_{min}$ according to a candidate-moment set, where $N_{min}$ is a positive integer.

Specifically, the first device may determine the first backoff threshold $N_{min}$ by using the following formula:

$$N_{min} = \left\lceil \frac{\Delta_t}{\Delta_{CCA}} \right\rceil \quad \text{Formula 1.1}$$

The symbol "⌈ ⌉" represents rounding up, $\Delta_t$ represents a maximum time interval between two candidate moments in the candidate-moment set, and $\Delta_{CCA}$ represents timeslot duration of a CCA detection.

602: The first device determines an initial backoff value N from [$N_{min}$, q], where q is a preset backoff threshold of the first device, and q is a positive integer greater than $N_{min}$.

603: The first device performs a CCA backoff process according to the initial backoff value N.

604: The first device determines a target candidate moment from the candidate-moment set when the backoff falls within a range of [0, $N_{min}$].

Specifically, the first device may determine a second moment, where the second moment is a moment at which a current backoff value $N_c$ is equal to the first backoff threshold $N_{min}$. The first device may determine, a first candidate moment in the candidate-moment set that is later than the second moment and that is not earlier than the second moment, as the target candidate moment. At the target candidate moment, the channel is idle. According to the formula 1.1, a time period in which the current backoff value $N_c$ changes from $N_{min}$ to 0 during the backoff includes at least one candidate moment in the candidate-moment set. Therefore, the first device may determine the target candidate moment from the candidate-moment set. Certainly, the target candidate moment is earlier than a third moment, and the third moment is a moment at which the current backoff value $N_c$ is equal to 0.

605: The first device starts to send data to a second device on a channel from the determined target candidate moment.

606: The second device determines each candidate moment in the candidate-moment set.

607: The second device performs a channel detection on the channel at each candidate moment, so as to receive the data on the channel.

It may be understood that, the first device may not start to send data to the second device from each candidate moment, but the second device starts to perform a channel detection from each candidate moment. Therefore, step 606 and step 607 may be performed before or after any one of step 601 to step 605.

According to the method shown in FIG. 6, a moment at which a first device sends data is a candidate moment in a preset candidate-moment set. A second device also starts to perform a channel detection only at a candidate moment in the candidate-moment set, so as to receive the data. In this way, the second device can accurately receive the data sent by the first device, without needing to continually perform the channel detection. In this case, power consumption of the second device during receiving of the data is greatly reduced.

Figure 7:
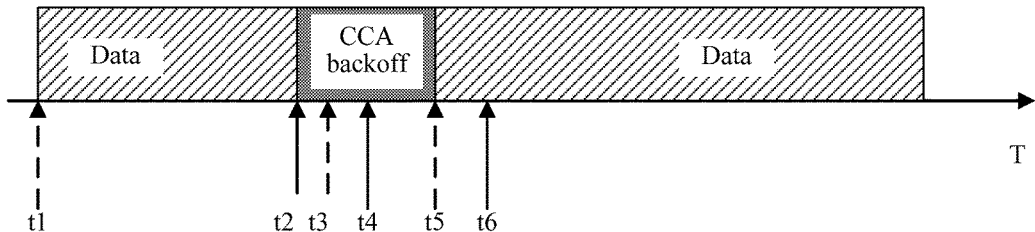
FIG. 7 is a schematic diagram of a data transmission method according to another embodiment of the present disclosure.

FIG. 7 is a schematic diagram of a data transmission method according to another embodiment of the present disclosure. Specifically, a sequence diagram shown in FIG. 7 is a schematic diagram according to the data transmission method shown in FIG. 6.

Moments t1, t3, and t5 shown in FIG. 7 are three continual candidate moments in a candidate-moment set. In other words, the three moments t1, t3, and t5 are moments at which data may be sent. Therefore, a second device may perform a channel detection at the three moments, so as to prepare to receive the data. A moment t2 is a moment at which a first device starts to perform a CCA backoff. At the moment t2, a current backoff value $N_c$ of the first device is equal to an initial backoff value N. A moment t4 is a moment at which the current backoff value $N_c$ is equal to $N_{min}$. If the first device continues to perform the CCA backoff until the current backoff value $N_c$ is equal to 0, a moment at which the current backoff value is equal to 0 is a moment t6. It may be seen that, the first device may start, from a first candidate moment after the moment t4, to send the data by using a channel. In addition, the first device starts to send the data before a result of the CCA backoff becomes that $N_c$ is equal to 0.

Figure 8:
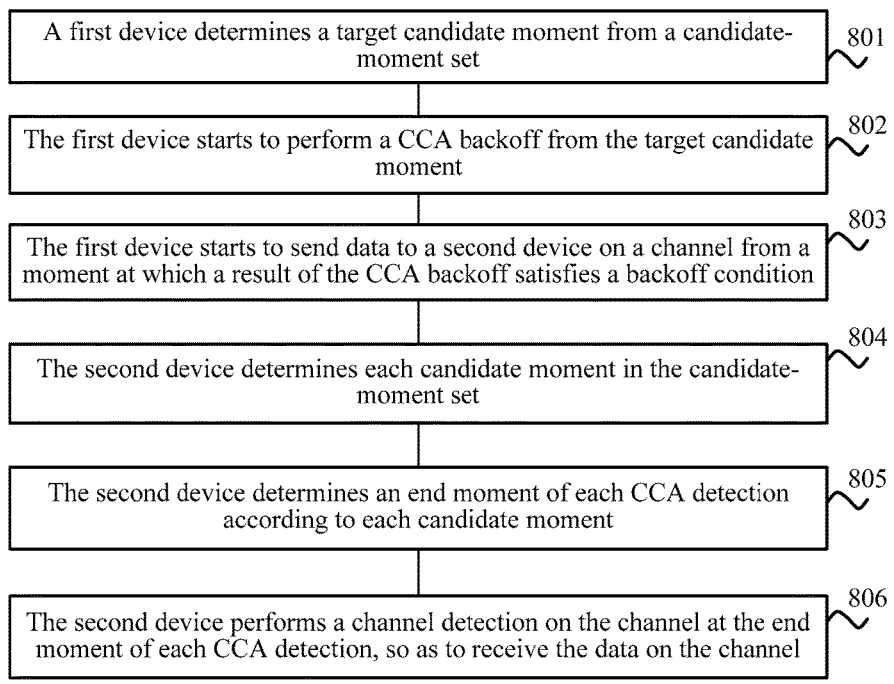
FIG. 8 is a schematic flowchart of a data transmission method according to another embodiment of the present disclosure.

FIG. 8 is a schematic flowchart of a data transmission method according to another embodiment of the present disclosure.

801: A first device determines a target candidate moment from a candidate-moment set.

802: The first device starts to perform a CCA backoff from the target candidate moment.

803: The first device starts to send data to a second device on a channel from a moment at which a result of the CCA backoff satisfies a backoff condition.

804: The second device determines each candidate moment in the candidate-moment set.

805: The second device determines an end moment of each CCA detection according to each candidate moment.

Because each candidate moment may be a start moment of the CCA backoff and duration of the CCA detection is known, the second device may determine the end moment of each CCA detection according to each candidate moment.

806: The second device performs a channel detection on the channel at the end moment of each CCA detection, so as to receive the data on the channel.

According to the method shown in FIG. 8, a moment at which the CCA backoff starts to be performed is determined according to the preset candidate-moment set, and duration of each CCA detection is known. Therefore, the end moment of each CCA detection is also known. A start moment at which the first device sends the data is the end moment of the CCA detection. Therefore, the second device may start to listen to a channel resource at the end moment of each CCA detection. In this way, the second device does not need to continually perform a channel detection during a CCA detection. Therefore, power consumption of the second device is reduced.

Figure 9:
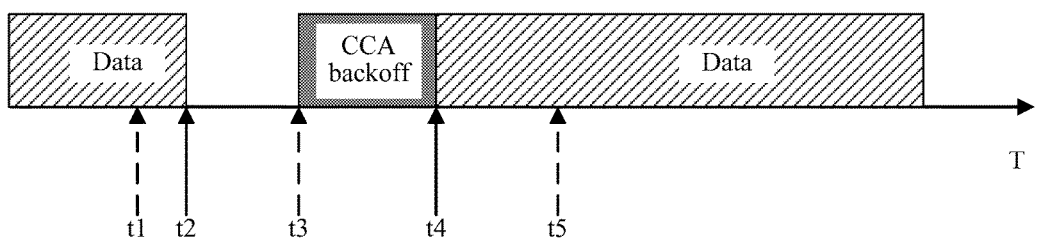
FIG. 9 is a schematic diagram of a data transmission method according to another embodiment of the present disclosure.

FIG. 9 is a schematic diagram of a data transmission method according to another embodiment of the present disclosure. Specifically, a sequence diagram shown in FIG. 9 is a schematic diagram according to the data transmission method shown in FIG. 8.

Moments t1, t3, and t5 shown in FIG. 9 are three continual candidate moments in a candidate-moment set. A second device may determine an end moment of each CCA detection according to each candidate moment, and perform a channel detection at the end moment of each CCA detection, so as to receive data. At the candidate moment t1, a channel resource is occupied. The channel resource becomes idle from the moment t2. A first device starts to perform a CCA backoff from a first candidate moment (that is, the moment t3) after the moment t2. At a moment t4, a result of the CCA backoff satisfies a backoff condition. The first device starts to send the data from the moment t4.

Figure 10:
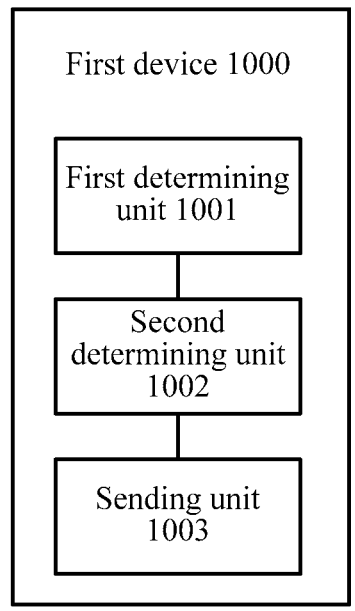
FIG. 10 is a structural block diagram of a first device according to an embodiment of the present disclosure.

FIG. 10 is a structural block diagram of a first device according to an embodiment of the present disclosure. As shown in FIG. 10, the first device 1000 includes a first determining unit 1001, a second determining unit 1002, and a sending unit 1003.

The first determining unit 1001 is configured to determine a candidate-moment set.

The second determining unit 1002 is configured to determine a target candidate moment from the candidate-moment set determined by the first determining unit 1001.

The sending unit 1003 is configured to send data on a channel according to the target candidate moment determined by the second determining unit 1002.

A moment at which the first device 1000 shown in FIG. 10 sends data is determined according to a candidate moment in a candidate-moment set. In this case, a corresponding device that receives the data may also determine, according to the candidate moment in the candidate-moment set, a moment at which the data can be received. That is, the device that receives the data may perform a channel detection only at a moment at which the data can be sent and that is specified in a system, and does not need to continually perform the channel detection at other moments. According to the first device 1000, power consumption of the device, which receives the data, during the channel detection can be reduced.

Optionally, in an embodiment, the second determining unit 1002 is specifically configured to determine the target candidate moment from the candidate-moment set according to an end moment of a clear channel assessment CCA backoff process. The sending unit 1003 is specifically configured to start to send the data on the channel from the target candidate moment.

Further, the second determining unit 1002 is specifically configured to determine the target candidate moment from the candidate-moment set, where the target candidate moment is equal to or later than the end moment of the CCA backoff process.

Further, the sending unit 1003 is further configured to: if the target candidate moment is a candidate moment in the candidate-moment set that is later than the end moment of the CCA backoff process, start to send padding data on the channel from the end moment of the CCA backoff process, and stop sending the padding data on the channel from the target candidate moment, where the target candidate moment is a first candidate moment in the candidate-moment set that is later than the end moment of the CCA backoff process.

Further, the second determining unit 1002 is further configured to: if the target candidate moment is a candidate moment in the candidate-moment set that is later than the end moment of the CCA backoff process, start to perform a CCA detection from the end moment of the CCA backoff process, and stop performing the CCA detection from the target candidate moment, where the target candidate moment is a first candidate moment in the candidate-moment set at which the channel is idle and that is later than the end moment of the CCA backoff process.

Optionally, in another embodiment, the second determining unit 1002 is specifically configured to: determine a first backoff threshold $N_{min}$ according to the candidate-moment set, where $N_{min}$ is a positive integer; determine an initial backoff value N from [$N_{min}$, q], where q is a preset backoff threshold of the first device, and q is a positive integer greater than $N_{min}$; perform a clear channel assessment CCA backoff process according to the initial backoff value N; determine a current backoff value $N_c$; determine a second moment, where the second moment is a moment at which the current backoff value $N_c$ is equal to the first backoff threshold $N_{min}$; and determine the target candidate moment from the candidate-moment set, where the target candidate moment is not earlier than the second moment, the target candidate moment is earlier than a third moment, and the third moment is a moment at which the current backoff value $N_c$ is equal to 0. The sending unit 1003 is specifically configured to start to send the data on the channel from the target candidate moment.

Optionally, in another embodiment, the second determining unit 1002 is further configured to start to perform a clear channel assessment CCA backoff process from the target candidate moment. The sending unit 1003 is specifically configured to start to send the data on the channel from an end moment of the CCA backoff process.

Optionally, in an embodiment, the first determining unit 1001 is specifically configured to determine the candidate-moment set according to a preset moment on the channel.

The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

Figure 11:
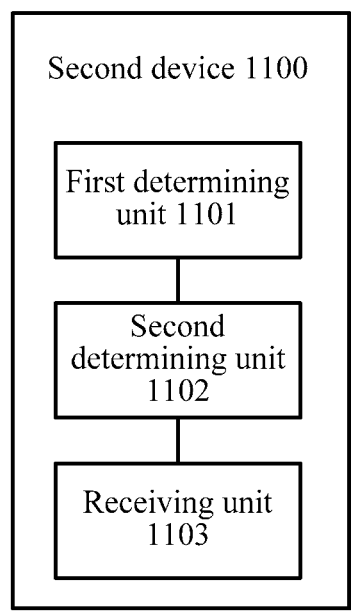
FIG. 11 is a structural block diagram of a second device according to an embodiment of the present disclosure.

FIG. 11 is a structural block diagram of a second device according to an embodiment of the present disclosure. As shown in FIG. 11, the second device 1100 includes a first determining unit 1101, a second determining unit 1102, and a receiving unit 1103.

The first determining unit 1101 is configured to determine a candidate-moment set.

The second determining unit 1102 is configured to determine each candidate moment in the candidate-moment set determined by the first determining unit 1101.

The receiving unit 1103 is configured to receive data on a channel according to each candidate moment determined by the second determining unit 1102.

The second device 1100 shown in FIG. 11 may determine, according to each candidate moment in the candidate-moment set, the moment at which the data can be received. That is, the second device 1100 may perform a channel detection only at a moment at which the data can be sent and that is specified in a system, and does not need to continually perform the channel detection at other moments. Therefore, power consumption of the second device 1100 during the channel detection is reduced.

Optionally, in an embodiment, the receiving unit 1103 is specifically configured to perform a channel detection on the channel at each candidate moment, so as to receive the data on the channel.

Optionally, in another embodiment, the second determining unit 1102 is further configured to determine an end moment of each clear channel assessment CCA detection according to each candidate moment. The receiving unit 1103 is specifically configured to perform a channel detection on the channel at the end moment of each CCA detection, so as to receive the data on the channel.

Optionally, in an embodiment, the first determining unit 1101 is specifically configured to determine the candidate-moment set according to a preset moment on the channel.

The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

Figure 12:
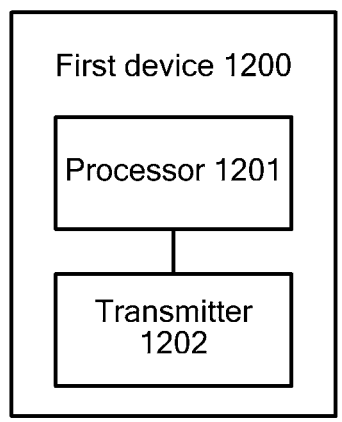
FIG. 12 is a structural block diagram of a first device according to an embodiment of the present disclosure.

FIG. 12 is a structural block diagram of a first device according to an embodiment of the present disclosure. As shown in FIG. 12, the first device 1200 includes a processor 1201 and a transmitter 1202.

The processor 1201 is configured to determine a candidate-moment set.

The processor 1201 is further configured to determine a target candidate moment from the candidate-moment set determined by the processor 1201.

The transmitter 1202 is configured to send data on a channel according to the target candidate moment determined by the processor 1201.

A moment at which the first device 1200 shown in FIG. 12 sends data is determined according to a candidate moment in a candidate-moment set. In this case, a corresponding device that receives the data may also determine, according to the candidate moment in the candidate-moment set, a moment at which the data can be received. That is, the device that receives the data may perform a channel detection only at a moment at which the data can be sent and that is specified in a system, and does not need to continually perform the channel detection at other moments. According to the first device 1200, power consumption of the device, which receives the data, during the channel detection can be reduced.

Optionally, in an embodiment, the processor 1201 is specifically configured to determine the target candidate moment from the candidate-moment set according to an end moment of a clear channel assessment CCA backoff process. The transmitter 1202 is specifically configured to start to send the data on the channel from the target candidate moment.

Further, the processor 1201 is specifically configured to determine the target candidate moment from the candidate-moment set, where the target candidate moment is equal to or later than the end moment of the CCA backoff process.

Further, the transmitter 1202 is further configured to: if the target candidate moment is a candidate moment in the candidate-moment set that is later than the end moment of the CCA backoff process, start to send padding data on the channel from the end moment of the CCA backoff process, and stop sending the padding data on the channel from the target candidate moment, where the target candidate moment is a first candidate moment in the candidate-moment set that is later than the end moment of the CCA backoff process.

Further, the processor 1201 is further configured to: if the target candidate moment is a candidate moment in the candidate-moment set that is later than the end moment of the CCA backoff process, start to perform a CCA detection from the end moment of the CCA backoff process, and stop performing the CCA detection from the target candidate moment, where the target candidate moment is a first candidate moment in the candidate-moment set at which the channel is idle and that is later than the end moment of the CCA backoff process.

Optionally, in another embodiment, the processor 1201 is specifically configured to: determine a first backoff threshold $N_{min}$ according to the candidate-moment set, where $N_{min}$ is a positive integer; determine an initial backoff value N from $[N_{min}, q]$, where q is a preset backoff threshold of the first device, and q is a positive integer greater than $N_{min}$; perform a clear channel assessment CCA backoff process according to the initial backoff value N; determine a current backoff value $N_c$; determine a second moment, where the second moment is a moment at which the current backoff value $N_c$ is equal to the first backoff threshold $N_{min}$; and determine the target candidate moment from the candidate-moment set, where the target candidate moment is not earlier than the second moment, the target candidate moment is earlier than a third moment, and the third moment is a moment at which the current backoff value $N_c$ is equal to 0. The transmitter 1202 is specifically configured to start to send the data on the channel from the target candidate moment.

Optionally, in another embodiment, the processor 1201 is further configured to start to perform a clear channel assessment CCA backoff process from the target candidate moment. The transmitter 1202 is specifically configured to start to send the data on the channel from an end moment of the CCA backoff process.

Optionally, in an embodiment, the processor 1201 is specifically configured to determine the candidate-moment set according to a preset moment on the channel.

The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

Figure 13:
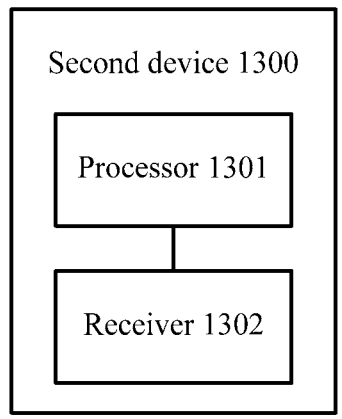
FIG. 13 is a structural block diagram of a second device according to an embodiment of the present disclosure.

FIG. 13 is a structural block diagram of a second device according to an embodiment of the present disclosure. As shown in FIG. 13, the second device 1300 includes a processor 1301 and a receiver 1302.

The processor 1301 is configured to determine a candidate-moment set.

The processor 1301 is further configured to determine each candidate moment in the candidate-moment set determined by the processor 1301.

The receiver 1302 is configured to receive data on a channel according to each candidate moment determined by the processor 1301.

The second device 1300 shown in FIG. 13 may determine, according to each candidate moment in the candidate-moment set, the moment at which the data can be received. That is, the second device 1300 may perform a channel detection only at a moment at which the data can be sent and that is specified in a system, and does not need to continually perform the channel detection at other moments. Therefore, power consumption of the second device 1300 during the channel detection is reduced.

Optionally, in an embodiment, the receiver 1302 is specifically configured to perform a channel detection on the channel at each candidate moment, so as to receive the data on the channel.

Optionally, in another embodiment, the processor 1301 is further configured to determine an end moment of each clear channel assessment CCA detection according to each candidate moment. The receiver 1302 is specifically configured to perform a channel detection on the channel at the end moment of each CCA detection, so as to receive the data on the channel.

Optionally, in an embodiment, the processor 1301 is specifically configured to determine the candidate-moment set according to a preset moment on the channel.

The preset moment on the channel is any one of the following moments: a start moment of an orthogonal frequency division multiplexing (OFDM) symbol on the channel, a moment that corresponds to each 1/K of an OFDM symbol on the channel, a start moment of a timeslot on the channel, a start moment of a data subframe on the channel, a start moment of a data frame on the channel, or a start moment of M sampling periods on the channel, where K is a positive integer greater than 1, and M is a positive integer.

For example, if the preset moment is a start moment of M sampling periods on the channel, the first candidate moment in the candidate-moment set is a start moment of a data frame whose system frame number is n, where n is a positive integer or n may be equal to 0. Other candidate moments in the candidate-moment set are start moments of the M sampling periods on the channel. For example, M may be equal to 560 or 624.

For another example, if the preset moment is a moment that corresponds to each 1/K of the OFDM symbol on the channel, a value of K may be 2 or 3. That is, each ½ or each ⅓ of the OFDM symbol on the channel is used as a candidate moment in the candidate-moment set.

Certainly, the candidate moments in the candidate-moment set may be multiple moments of a subframe on the channel. Candidate moments in one subframe and a quantity of the candidate moments in one subframe may be related to sampling periods. For example, 30 candidate moments in 576 sampling periods and 24 candidate moments in 560 sampling periods may be preset in one subframe. The 30 candidate moments in the 576 sampling periods mean that totally 30 candidate moments are set in the subframe, and each candidate moment is a start moment of one of the 576 sampling periods. Similarly, the 24 candidate moments in the 560 sampling periods mean that totally 24 candidate moments are set in the subframe, and each candidate moment is a start moment of one of the 560 sampling periods. That is, the subframe may totally include 54 candidate moments. 30 candidate moments of the 54 candidate moments are start moments of the 576 sampling periods, and 24 candidate moments of the 54 candidate moments are start moments of the 560 sampling periods. An arrangement order of the 54 candidate moments is not limited. For another example, 9 candidate moments in 640 sampling periods and 40 candidate moments in 624 sampling periods may be preset in one subframe. In this case, the subframe totally includes 49 candidate moments. 9 candidate moments of the 49 candidate moments are start moments of the 640 sampling periods, and 40 candidate moments of the 49 candidate moments are start moments of the 624 sampling periods.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
   determining, by a first device, a candidate-moment set according to a preset moment on a channel, wherein each candidate moment in the candidate-moment set comprises a moment in time, and wherein the preset moment on the channel is a start moment of a timeslot on the channel or a start moment of a data subframe on the channel;
   determining, by the first device, a target candidate moment from the candidate-moment set, wherein the target candidate moment is a candidate moment in the candidate-moment set that is equal to or later than an end moment of a clear channel assessment (CCA) backoff process; and
   sending, by the first device, data on a channel according to the target candidate moment.

2. The method according to claim 1,
   wherein the sending, by the first device, the data on the channel according to the target candidate moment comprises:
      starting, by the first device, to send the data on the channel from the target candidate moment.

3. The method according to claim 2, wherein in response to determining that the target candidate moment is the candidate moment in the candidate-moment set that is later than the end moment of the CCA backoff process, the method further comprises:
   starting, by the first device, to send padding data on the channel from the end moment of the CCA backoff process; and
   stopping, by the first device, sending the padding data on the channel from the target candidate moment, wherein the target candidate moment is a first candidate moment in the candidate-moment set that is later than the end moment of the CCA backoff process.

4. The method according to claim 1, wherein in response to determining that the target candidate moment is a candidate moment in the candidate-moment set that is later than the end moment of the CCA backoff process, the method further comprises:
   starting, by the first device, to perform a CCA detection after the end moment of the CCA backoff process; and
   stopping, by the first device, performing the CCA detection from the target candidate moment, wherein the target candidate moment is a first candidate moment in the candidate-moment set at which the channel is idle and that is later than the end moment of the CCA backoff process.

5. The method according to claim 1, wherein the sending, by the first device, the data on the channel further comprises:
   starting, by the first device, to perform the CCA backoff process from the target candidate moment; and
   starting, by the first device, to send the data on the channel from the end moment of the CCA backoff process.

6. A data transmission method, comprising:
   determining, by a first device, a candidate-moment set, wherein each candidate moment in the candidate-moment set comprises a moment in time;
   determining, by the first device, a target candidate moment from the candidate-moment set; and
   sending, by the first device, data on a channel according to the target candidate moment;
   wherein the determining, by the first device, the target candidate moment from the candidate-moment set comprises:
      determining, by the first device, a first backoff threshold $N_{min}$ according to the candidate-moment set, wherein $N_{min}$ is a positive integer;
      determining, by the first device, an initial backoff value N from [$N_{min}$, q], wherein q is a preset backoff threshold of the first device, and q is a positive integer greater than $N_{min}$;
      performing, by the first device, a clear channel assessment (CCA) backoff process according to the initial backoff value N;
      determining, by the first device, a current backoff value $N_c$;
      determining, by the first device, a second moment, wherein the second moment is a moment at which the current backoff value $N_c$ is equal to the first backoff threshold $N_{min}$; and
      determining, by the first device, the target candidate moment from the candidate-moment set, wherein the target candidate moment is not earlier than the second moment, the target candidate moment is earlier than a third moment, and the third moment is a moment at which the current backoff value $N_c$ is equal to 0; and
   wherein the sending, by the first device, the data on the channel according to the target candidate moment comprises:
      starting, by the first device, to send the data on the channel from the target candidate moment.

7. A first device, comprising:
   a processor; and
   a transmitter,
   wherein the processor is configured to:
      determine a candidate-moment set according to a preset moment on a channel, wherein each candidate moment in the candidate-moment set comprises a moment in time, and wherein the preset moment on the channel is a start moment of a timeslot on the channel or a start moment of a data subframe on the channel; and determine a target candidate moment from the candidate-moment set determined by the processor, wherein the target candidate moment is a candidate moment in the candidate-moment set that is equal to or later than an end moment of a clear channel assessment (CCA) backoff process; and wherein the transmitter is configured to send data on a channel according to the target candidate moment determined by the processor.

8. The device according to claim 7, wherein:

the transmitter is configured to start to send the data on the channel from the target candidate moment.

9. The device according to claim 8, wherein, in response to the processor determining that the target candidate moment is a candidate moment in the candidate-moment set that is later than the end moment of the CCA backoff process, the transmitter is further configured to:

start to send padding data on the channel from the end moment of the CCA backoff process, and stop sending the padding data on the channel from the target candidate moment, wherein the target candidate moment is a first candidate moment in the candidate-moment set that is later than the end moment of the CCA backoff process.

10. The device according to claim 7, wherein the processor is further configured to:

in response to determining that the target candidate moment is a candidate moment in the candidate-moment set that is later than the end moment of the CCA backoff process, start to perform a CCA detection after the end moment of the CCA backoff process, and stop performing the CCA detection from the target candidate moment, wherein the target candidate moment is a first candidate moment in the candidate-moment set at which the channel is idle and that is later than the end moment of the CCA backoff process.

11. The device according to claim 7, wherein:

the processor is configured to: determine a first backoff threshold $N_{min}$ according to the candidate-moment set, wherein $N_{min}$ is a positive integer; determine an initial backoff value N from $[N_{min}, q]$, wherein q is a preset backoff threshold of the first device, and q is a positive integer greater than $N_{min}$; perform the CCA backoff process according to the initial backoff value N; determine a current backoff value $N_c$; determine a second moment, wherein the second moment is a moment at which the current backoff value $N_c$ is equal to the first backoff threshold $N_{min}$; and determine the target candidate moment from the candidate-moment set, wherein the target candidate moment is not earlier than the second moment, the target candidate moment is earlier than a third moment, and the third moment is a moment at which the current backoff value $N_c$ is equal to 0; and the transmitter is configured to start to send the data on the channel from the target candidate moment.

12. The device according to claim 7, wherein:

the processor is further configured to start to perform the CCA backoff process from the target candidate moment; and the transmitter is configured to start to send the data on the channel from the end moment of the CCA backoff process.

* * * * *